United States Patent
Bosselmann et al.

(10) Patent No.: US 7,969,165 B2
(45) Date of Patent: Jun. 28, 2011

(54) DEVICE FOR DETERMINING THE DISTANCE BETWEEN A ROTOR BLADE AND A WALL OF A TURBINE ENGINE SURROUNDING THE ROTOR BLADE

(75) Inventors: Thomas Bosselmann, Marloffstein (DE); Michael Willsch, Jena (DE)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 12/311,384

(22) PCT Filed: Aug. 30, 2007

(86) PCT No.: PCT/EP2007/059048
§ 371 (c)(1),
(2), (4) Date: Mar. 26, 2009

(87) PCT Pub. No.: WO2008/040601
PCT Pub. Date: Apr. 10, 2008

(65) Prior Publication Data
US 2010/0066387 A1 Mar. 18, 2010

(30) Foreign Application Priority Data
Sep. 29, 2006 (DE) .......................... 10 2006 046 696

(51) Int. Cl.
*G01R 27/32* (2006.01)
(52) U.S. Cl. .......... 324/644; 415/14; 415/118; 343/783; 343/786; 343/909
(58) Field of Classification Search .................. 324/644; 343/783
See application file for complete search history.

(56) References Cited

U.S. PATENT DOCUMENTS

| | | | |
|---|---|---|---|
| 3,434,146 A * | 3/1969 | Petrich | 343/753 |
| 4,359,683 A * | 11/1982 | Chivers | 324/644 |
| 4,384,819 A * | 5/1983 | Baker | 415/14 |
| 4,507,658 A | 3/1985 | Keating | |
| 4,845,422 A * | 7/1989 | Damon | 324/644 |
| 4,955,269 A | 9/1990 | Kendig et al. | |
| 5,670,886 A * | 9/1997 | Wolff et al. | 324/644 |
| 6,005,397 A * | 12/1999 | Zoughi et al. | 324/644 |
| 7,511,513 B2 * | 3/2009 | Nevermann | 324/644 |
| 7,722,310 B2 * | 5/2010 | Balasubramaniam et al. | 415/14 |
| 2002/0080080 A1 * | 6/2002 | Kloefer et al. | 343/785 |
| 2003/0094956 A1 * | 5/2003 | Orenstein | 324/644 |
| 2007/0024505 A1 * | 2/2007 | Geisheimer et al. | 343/700 MS |

(Continued)

FOREIGN PATENT DOCUMENTS
DE 19705769 A1 8/1998
(Continued)

*Primary Examiner* — Timothy J Dole
*Assistant Examiner* — Benjamin M Baldridge

(57) ABSTRACT

A device for determining distance between a rotor blade and a wall of a gas turbine surrounding the rotor blade is provided. A waveguide guides and emits electromagnetic waves of at least one frequency in the direction of the rotor blade through a waveguide opening facing the rotor blade. The electromagnetic waves are injected into the waveguide and reflected portions of the electromagnetic waves are received. An evaluation unit compares the phase of the electromagnetic waves to be injected with the phase of the reflected portions of the electromagnetic waves and determines phase comparison values for every frequency and the distance is determined based on the phase comparison values. The waveguide comprises a sealing element which is configured to be transmissible for the electromagnetic waves of the frequency and which has two opposite surfaces in the direction of guidance of the electromagnetic waves.

10 Claims, 4 Drawing Sheets

U.S. PATENT DOCUMENTS

| | | | |
|---|---|---|---|
| 2007/0132461 A1* | 6/2007 | Holmquist et al. | 324/644 |
| 2007/0222459 A1* | 9/2007 | Andarawis et al. | 324/644 |
| 2008/0106272 A1* | 5/2008 | Maier et al. | 324/644 |
| 2009/0134884 A1* | 5/2009 | Bosselmann et al. | 324/644 |
| 2009/0226302 A1* | 9/2009 | Simpson et al. | 415/148 |

FOREIGN PATENT DOCUMENTS

| | | |
|---|---|---|
| DE | 19817430 A1 | 10/1999 |
| GB | 2055269 A | 2/1981 |
| GB | 2063001 A | 5/1981 |
| JP | 10006861 A1 | 1/1998 |

\* cited by examiner

DEVICE FOR DETERMINING THE DISTANCE BETWEEN A ROTOR BLADE AND A WALL OF A TURBINE ENGINE SURROUNDING THE ROTOR BLADE

CROSS REFERENCE TO RELATED APPLICATIONS

This application is the US National Stage of International Application No. PCT/EP2007/059084, filed Aug. 30, 2007 and claims the benefit thereof. The International Application claims the benefits of German application No. 10 2006 046 696.9 filed Sep. 29, 2006, both of the applications are incorporated by reference herein in their entirety.

FIELD OF THE INVENTION

The invention relates to a device for determining the distance between at least one rotor blade and a wall of a turbine engine, said wall surrounding the at least one rotor blade, and to a use of the method.

BACKGROUND OF THE INVENTION

Turbine engines such as steam or gas turbines, for example, are utilized as thermal power engines in engineering for the purpose of converting energy which is stored in a flow of gas into a mechanical energy, in particular into a rotational movement. In order to ensure the reliable operation of turbine engines of said kind, efforts are made to monitor the rotor blades of the blade wheel continuously, particularly during the operation and hence during the rotation of a blade wheel which is arranged in the turbine engine. In this case it is very important to exactly maintain the distance of the rotor blade tips, i.e. the radially outermost edges of the rotor blades, from the wall surrounding the rotor blades (radial clearance). A minimum radial clearance must be satisfied for safety reasons, although too great a radial clearance results in unnecessarily low efficiency. In addition to the radial clearance, the axial distance to wall sections is also important, particularly in the case of blade wheels in which the blade rows are covered by a shroud. Because these variables change due to various dynamic influencing factors, continuous monitoring of the radial clearance and the axial clearance is important during operation. The size of the radial clearance can be monitored e.g. by means of capacitive sensors which are positioned close to and almost touching the blade tips. However, these sensors are limited in terms of accuracy, spatial resolution and service life.

DE 197 05 769 A1 discloses a device for monitoring radial and axial clearance in a turbine engine. In this case use is made of a microwave radar system comprising a transmit and receive unit from which microwaves having a fixed frequency are directed through a waveguide onto a blade wheel of the turbine engine. In this case the waveguide is ducted through the housing which surrounds the blade wheel and is fixed there. The outlet of the waveguide is arranged very closely over the rotor blade tips of the blade wheel such that it is possible to determine from the reflection of the emitted electromagnetic waves the distance of a rotor blade tip from the waveguide end and hence from the wall surrounding the rotor blade. The determining is done by means of an evaluation of the phase of the reflected microwaves. The distance is determined by determining the phase difference between emitted and reflected microwaves.

Extreme conditions can prevail in the region of the blade wheel within the housing during operation, particularly in gas turbines. With gas turbines in particular, temperatures of approximately 1200° C. occur in the case of flows having velocities around 100 m/s and a gas pressure in the region of 16 bar. These extreme conditions can penetrate at least so far through the waveguide to the transmit and receive unit connected to the waveguide that said transmit and receive unit will be damaged.

SUMMARY OF THE INVENTION

The object underlying the invention is thus to disclose an appropriate device and use of the device, wherein devices connected to the waveguide are protected against extreme conditions prevailing in the turbine engine during operation.

The object is achieved by a device according to the features recited in the independent claims.

Accordingly, the device for determining the distance between at least one rotor blade and a wall of a turbine engine, said wall surrounding the at least one rotor blade, comprises the following parts:
  a waveguide for guiding electromagnetic waves having different frequencies and emitting electromagnetic waves having at least one frequency in the direction of the rotor blade through at least one waveguide opening which faces the rotor blade,
  at least one means for injecting the electromagnetic waves having different frequencies into the waveguide,
  at least one means for receiving reflected portions of the electromagnetic waves to be injected into the waveguide, and
  an evaluation unit for evaluating the reflected portions to be received of the electromagnetic waves to be injected, comprising means for comparing the respective phases of the electromagnetic waves to be injected with the phases of the corresponding reflected portions of the electromagnetic waves to be injected, wherein a phase comparison value can be ascertained for each frequency by means of the evaluation unit and the distance can be determined from a comparison of the phase comparison values,
and is embodied such that
  the waveguide is provided with a sealing element which is embodied so as to be transmissible for the electromagnetic waves having the at least one frequency, and
  has two surfaces disposed opposite each other in the guide direction of the electromagnetic waves.

By means of the seal the waveguide is thus sealed off from the rotor blade region in which extreme conditions prevail when the turbine engine is in operation.

It is therefore possible to perform a distance measurement with the aid of electromagnetic waves which are guided by means of a waveguide through the wall of the turbine engine into the rotor blade region without the extreme conditions prevailing in the rotor blade region penetrating through the waveguide.

Advantageous embodiments of the device according to the invention are derived from the claims that are dependent on the independent claims. In this case the embodiment according to the independent claims can be combined with the features of one of the associated dependent claims, or preferably also with the features of a plurality of dependent claims. Accordingly, the inventive device can additionally have further features as follows:

The sealing element can thus be provided in the region of the waveguide opening. In this way an optimal level of protection is ensured for the waveguide and the devices connected to the waveguide, such as e.g. the evaluation unit.

Advantageously, at least one of the two surfaces can be embodied as convex, thereby enabling the electromagnetic waves having the at least one frequency to be emitted onto the rotor blade in a focused manner. In this way it is possible also to resolve in particular the tip of the rotor blade laterally such that a rotor blade tip profile can be determined.

Advantageously, at least one of the two surfaces can also be embodied as concave, thereby enabling the electromagnetic waves having the at least one frequency to be emitted in the direction of the rotor blade in a scattered manner. By means of this embodiment measure also it is possible to resolve in particular the tip of the rotor blade laterally. In this case the well-known SAR method (SAR: Synthetic Aperture Radar) is applied in the evaluation unit during the evaluation of the electromagnetic waves scattered at the rotor blade tip.

On the other hand it can also be favorable if the two opposite surfaces of the sealing element are embodied as flat and parallel to each other, the sealing element being embodied as reflectable for electromagnetic waves having at least one first frequency and as transmissible for electromagnetic waves having at least one second frequency. In this case the sealing element with its opposite parallel surfaces spaced apart from each other represents a resonator having frequency-selective properties. Depending on the distance between the two surfaces, only electromagnetic waves having specific wavelengths—the distance between the two surfaces is in this case an integral multiple of the half-wavelength—are transmitted through the sealing element. Electromagnetic waves having intermediate wavelengths, on the other hand, are reflected by the sealing element. If the phase comparison values of the portions of the electromagnetic waves to be injected that are reflected by the sealing element and the portions thereof that are transmitted through the sealing element and reflected at the rotor blades are compared with one another in the evaluation, a temperature-compensated distance value between the rotor blade and the turbine engine wall surrounding the rotor blade can be determined. A temperature-induced extension of the waveguide is computationally compensated for in this case.

It can be of advantage if the sealing element has a dielectric constant $\in$ in the range from 6 to 20, in particular 9 to 15. In this way the optical path of the electromagnetic waves in the waveguide can be influenced by means of the sealing element with little technical overhead being necessary at the sealing element. Moreover, if the sealing element is embodied as a resonator, a sufficiently high reflectivity of the sealing element surfaces (i.e. of the resonator surfaces) is guaranteed.

It can be favorable in this case if the sealing element is embodied from a ceramic, in particular $Al_2O_3$. In this way a very good temperature stability of the sealing element is ensured.

The electromagnetic waves can favorably be millimeter waves, in particular in the frequency range from 70 GHz to 150 GHz. Since the wavelengths at these frequencies are approximately 4 millimeters and less, it is possible herewith to deploy very compact waveguides whose cross-sectional dimensions are typically to be selected to match the dimensions of the wavelengths that are to be guided.

The invention also relates to a use of the inventive device for determining the distance between at least one rotor blade and a wall, surrounding the at least one rotor blade, of a turbine engine embodied as a gas turbine.

The waveguide can advantageously be arranged in a cooling channel of the wall in this case. Consequently, one of many cooling channels which are already provided in the wall for cooling purposes can be used for installing the device according to the invention.

BRIEF DESCRIPTION OF THE DRAWINGS

Preferred but by no means restrictive exemplary embodiments of the device will now explained in more detail with reference to the drawing. For the sake of clarity, the drawing is not to scale and certain features are illustrated schematically.

Corresponding parts are labeled with the same reference signs in FIGS. 1 to 4.

DETAILED DESCRIPTION OF THE INVENTION

Figure 1:
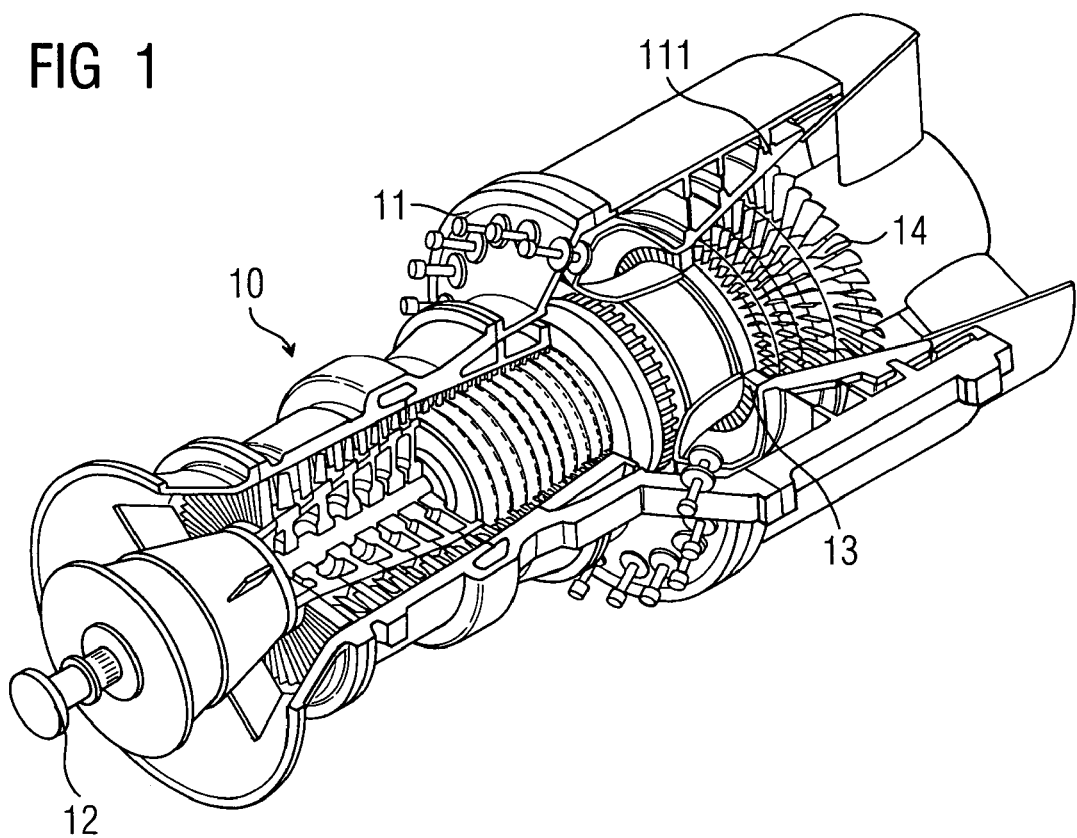
FIG. 1 shows a gas turbine according to the prior art in a partially sectioned perspective view.

FIG. 1 shows a gas turbine 10 according to the prior art which is designed for a high gas inlet temperature of approximately 1200° C. In a housing 11 comprising an inner wall 111, the gas turbine 10 has a rotatably mounted rotor shaft 12 on which rotor blades 14 are arranged in a flow channel 13.

Figure 2:
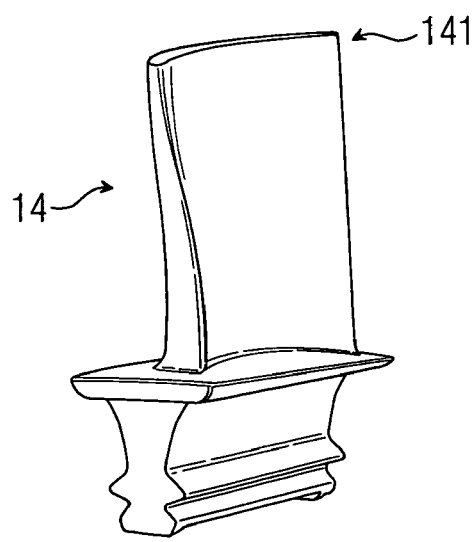
FIG. 2 shows a rotor blade of the gas turbine from FIG. 1.

FIG. 2 shows a rotor blade 14 of said type in detail in the uninstalled state. In the installed state the upper end of the rotor blade 14, the so-called rotor blade tip 141, faces the inner wall 111 of the gas turbine housing 11.

Figure 3:
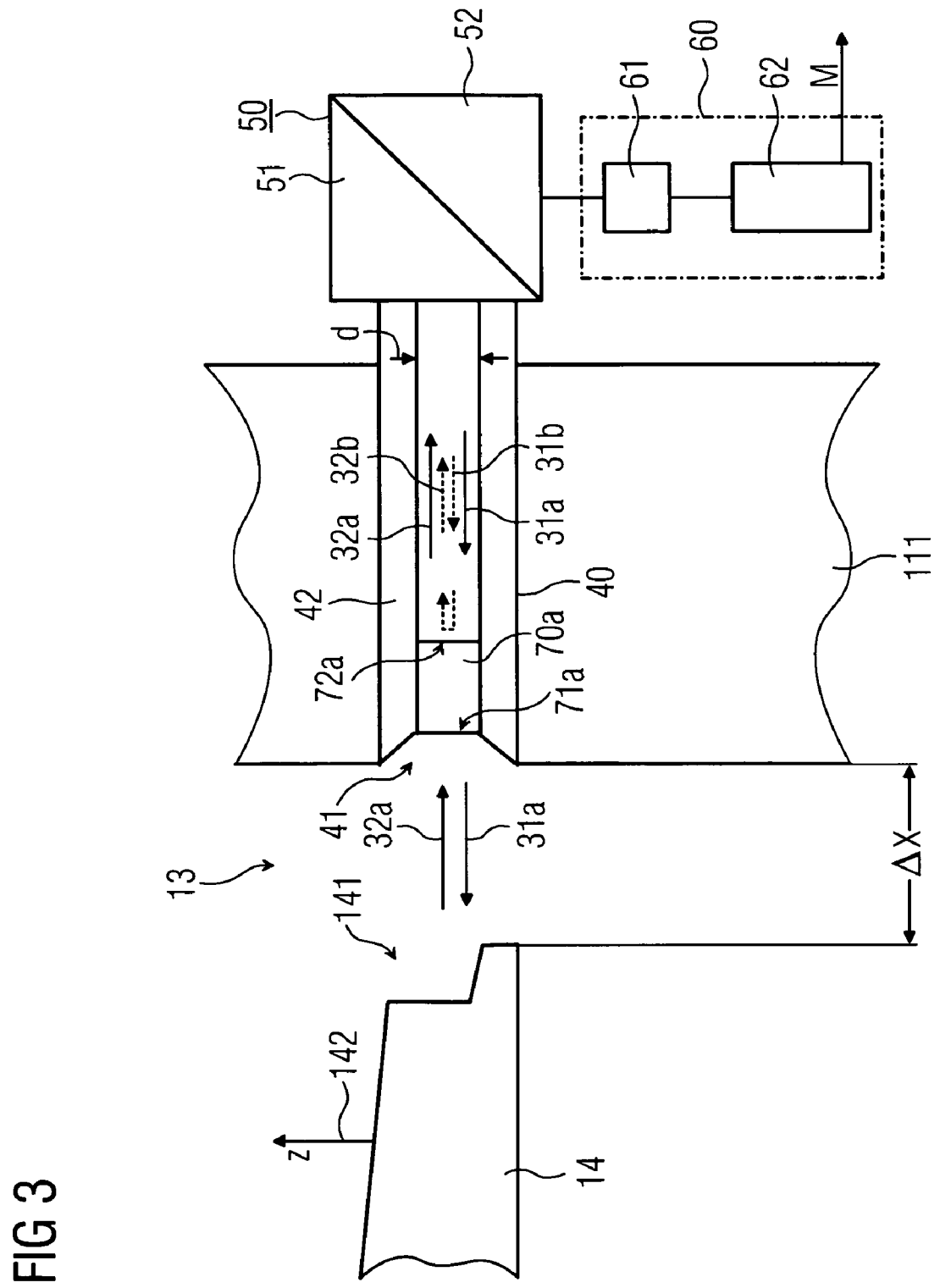
FIG. 3 shows a schematic illustration of the inventive device having a sealing element embodied as a resonator.

FIG. 3 shows a schematic illustration of the inventive device in a first exemplary embodiment. For the sake of simplicity, only part of a rotor blade 14 is shown in outline. The arrow 142 indicates that during a distance measurement the rotor blade 14 moves in the direction of the arrow 142 during operation of the gas turbine 10. In a first approximation the movement in the direction of the arrow can be considered as a linear movement in the lateral direction z. The rotor blade tip 141 is located at a radial distance $\Delta x$ from the inner wall 111 of the gas turbine housing 11. In order to ensure optimal efficiency of the gas turbine 10, the distance $\Delta x$ between the ends of the rotor blades 14, i.e. the rotor blade tips 141, and the inner wall 111 of the gas turbine housing 11 is as small as possible and typically lies within a range of a few millimeters, in particular between 1 mm and 20 mm. The wall 111 has at least one opening in which a waveguide 40 is arranged with a positive fit. The waveguide 40 is advantageously installed in one of numerous cooling channels which are already present in the wall 111. The waveguide 40 is embodied as tubular and has e.g. a round or rectangular cross-section having an internal diameter d in the range from 2 mm to 10 mm. The wall 42 of the waveguide 40 typically consists of a conductive material such as steel, for example. In particular one end of the waveguide 40 which is provided with an opening 41 is arranged in the wall 111 in such a way that it does not project or projects as little as possible into the flow channel 13 of the gas turbine 10 in order to affect the gas flow in the flow channel 13 to a minimum degree. According to the exemplary embodiment in FIG. 3, a sealing element 70a having two flat surfaces 71a, 72a disposed parallel to each other is arranged in the waveguide 40 in the region of the waveguide opening 41 in a positive-fitting manner with the inner cross-section of said waveguide 40. In this case the sealing element 70a seals off the waveguide 40 from the flow channel 13. The sealing element 70a is advantageously embodied from a ceramic, in particular $Al_2O_3$, which is at least partially transparent to electromagnetic radiation. In this case the dielectric constant ∈ of the ceramic should lie in particular in the range from 6 to 20, preferably 9 to 15. The other end of the waveguide 40 is connected to a transmit/receive unit 50 which comprises means for injecting 51 and receiving 52 electromagnetic waves 31*a*, 31*b*, 32*a*, 32*b*, in particular microwaves in the frequency range from 70 GHz to 150 GHz. The transmit/receive unit 50 is additionally connected to an evaluation unit 60.

An operation for determining the distance takes place as described in detail below:

The transmit/receive unit 50 injects electromagnetic waves 31*a*, 31*b* having e.g. two different frequencies a and b into the waveguide 40. Advantageously, the two frequencies a and b differ by at most 55% and at least 5% so that the assigned electromagnetic waves 31*a*, 31*b* can be guided by the same waveguide 40. In this case a bifrequent injection means 51 can be used as the injection means 51 or also two transmit means, each assigned to one frequency a or b, which are connected to the waveguide 40 via a waveguide transceiver filter (not shown in the figures). Owing to its embodiment with its two parallel, flat surfaces 71*a*, 72*a* the sealing element 70*a* represents a resonator for electromagnetic radiation 31*a* of specific frequencies a. If the distance of the two opposing surfaces 71*a*, 72*a* which are aligned in the waveguide 40 in the guide or propagation direction of the electromagnetic waves 31*a*, 32*a* (i.e. their surface normals coincide with the propagation direction of the electromagnetic waves) is a multiple of the half-wavelength of an electromagnetic wave 31*a* striking the resonator, said electromagnetic wave is reflected multiple times inside the resonator and at least a portion thereof is emitted in the direction of the rotor blade 14. The sealing element 70*a* can therefore be regarded as transmitting for an electromagnetic wave having said frequency a. In contrast, electromagnetic waves 31*b* having an intermediate frequency b are reflected back to the transmit/receive unit 50 already from the first sealing element surface 72*a* which the electromagnetic waves 31*b* strike after being injected into the waveguide 40. According to the exemplary embodiment in FIG. 3, the sealing element 70*a* therefore represents a frequency-selective element whose transmission and reflection properties are frequency-dependent.

According to the exemplary embodiment in FIG. 3, electromagnetic waves 31*a* having the frequency a are therefore transmitted through the sealing element 70*a*, whereas electromagnetic waves 31*b* having frequencies b are reflected back to the transmit/receive unit 50. In this case the transmitted electromagnetic waves 31*a* are then emitted through the waveguide opening 41 in the direction of the rotor blade 14. After traversing the distance Δx, at least a portion 32*a* of the emitted electromagnetic waves 31*a* is reflected from the rotor blade tips 141 to the waveguide 40, passes through the sealing element 70*a* again in the opposite direction and is then supplied from the waveguide 40 to the transmit/receive unit 50. The reflected portion 32*a*, 32*b* of the emitted e.g. bifrequent electromagnetic waves 31*a*, 31*b* is detected with the aid of e.g. a receive diode as a means 52 for receiving electromagnetic waves and converted into corresponding electrical signals which are supplied to the evaluation unit 60. The phase values $\phi_r a$ and $\phi_r b$ of the electromagnetic waves 32*a*, 32*b* that are assigned to the two frequencies a and b are initially determined from the electrical signals by means of the evaluation unit 60. The respective phases $\phi_0 a$, $\phi_0 b$ of the emitted electromagnetic waves 31*a*, 31*b* are then compared with the phases $\phi_r a$, $\phi_r b$ of the corresponding reflected portions 32*a*, 32*b* of the emitted electromagnetic waves 31*a*, 31*b* with the aid of a phase comparison means 61. The respective phase comparison value Δϕa or Δϕb, which is determined e.g. by means of a phase difference value $\Delta\phi a = \phi_r a - \phi_0 a$ or $\Delta\phi b = \phi_r b - \phi_0 b$, is directly dependent in this case on the distance traversed by the electromagnetic waves 31*a*, 31*b* that were injected by the injection means 51. In addition to the distance Δx that is to be determined between the rotor blade tip 141 and the wall 111 or the waveguide opening 41, the distance between sealing element 70*a* and transmit/receive unit 50 can also vary due to temperature as a result of a temperature-dependent extension of the wall 111 and hence also of the waveguide 40, thus making the desired distance determination inaccurate. This temperature-induced inaccuracy can be compensated for by comparing, for example using subtraction, the phase comparison values Δϕa or Δϕb of the portions 32*a* of the injected electromagnetic waves 31*a*, 31*b* reflected from the rotor blade tip 141 with the portions 32*b* reflected by the sealing element. The comparison value Δϕab thus obtained is then assigned with the aid of a further assignment means 62 to a measured value M for the distance Δx between rotor blade tip 141 and wall 111. The assignment can be made e.g. on the basis of a value table or also using a suitable algorithm.

The measured value M which is determined for the distance Δx of the at least one rotor blade 14 is reported to a monitoring point or forwarded to a central office via display or reporting units which are not shown in greater detail.

The evaluation unit 60 can also be equipped with a comparison function by means of which it is possible to detect that a predefinable distance threshold has not been met. Thus, for example, if the threshold value is not met, a message can be output automatically in order to initiate a suitable protective measure such as the shutting-down of the gas turbine 10, for example.

Figure 4:
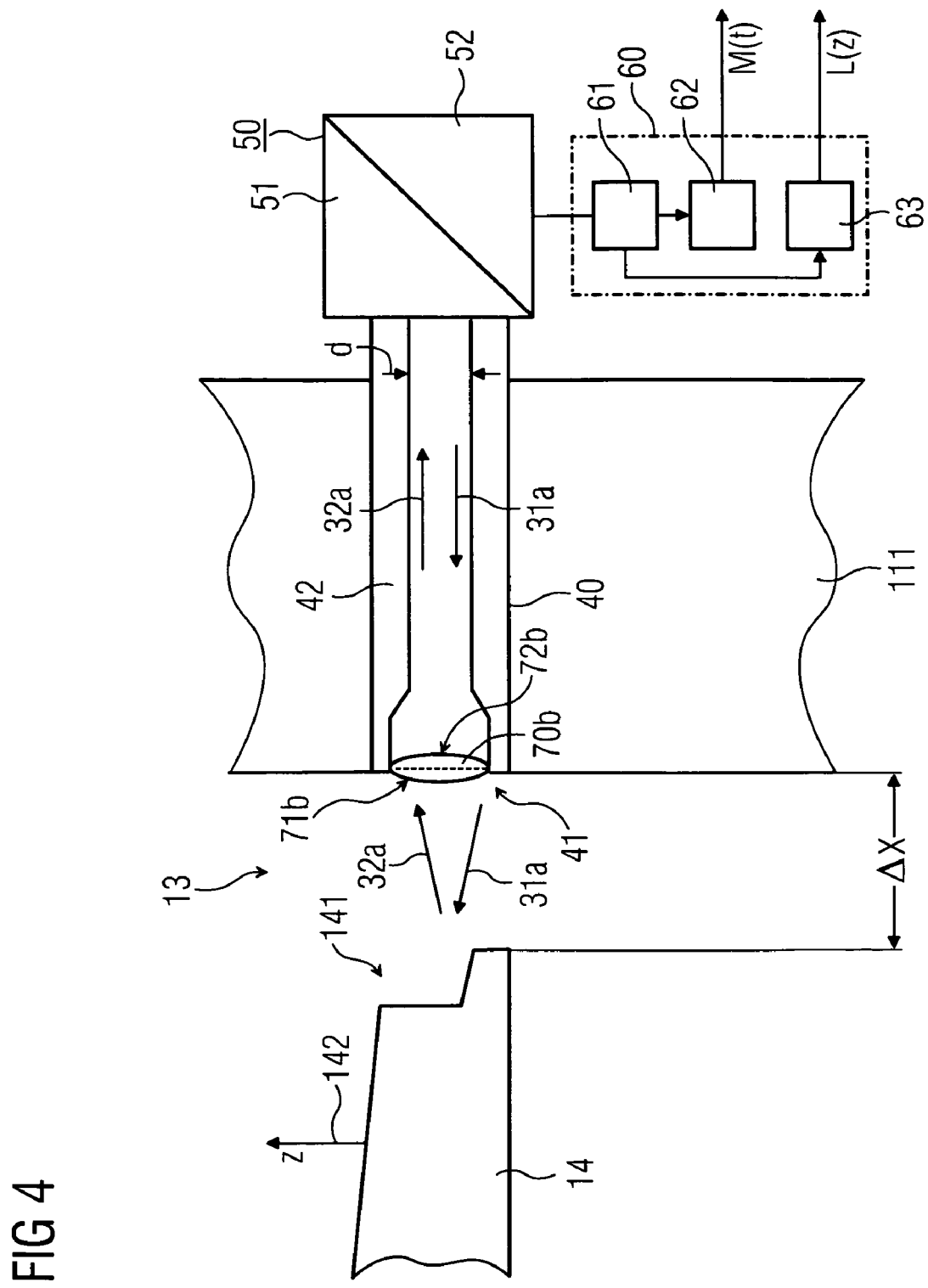
FIG. 4 shows a schematic illustration of the inventive device having a sealing element embodied as a lens with convex surfaces.
Figure 5:
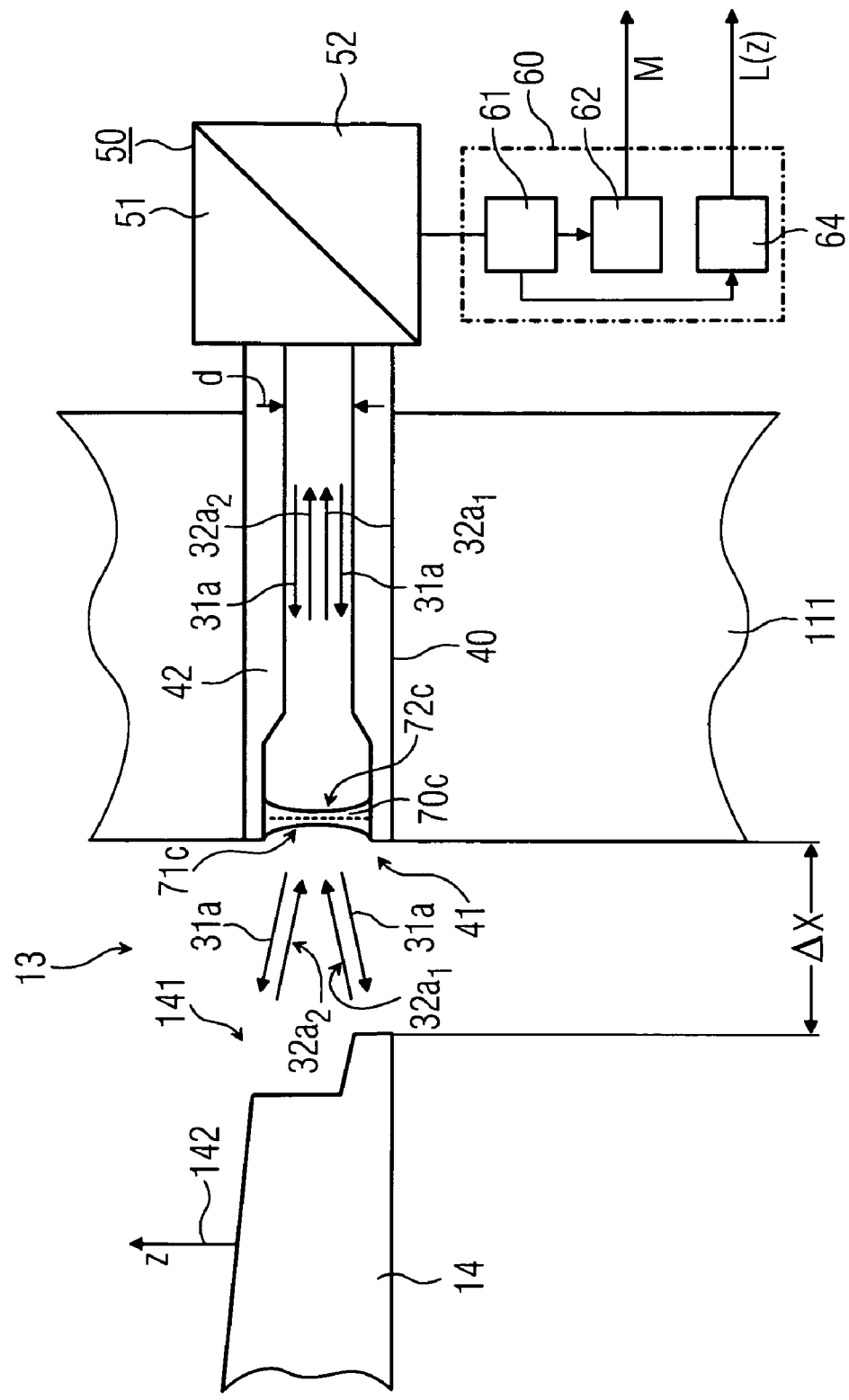
FIG. 5 shows a schematic illustration of the inventive device having a sealing element embodied as a lens with concave surfaces.

Two further exemplary embodiments of the inventive device are schematically illustrated in FIG. 4 and FIG. 5. They largely correspond to the exemplary embodiment according to FIG. 3. Only the differences are discussed in the following:

In both exemplary embodiments the sealing element 70*b*, 70*c* is embodied with curved surfaces 71*b*, 72*b*, 71*c*, 72*c* on both sides in the region of the waveguide opening 41. Whereas both surfaces 71*b*, 72*b* have a convex curve in FIG. 4, the sealing element according to FIG. 5 has two concave surfaces 71*c*, 72*c*. In both cases the sealing element 70*b*, 70*c* assumes the function of a lens for the electromagnetic waves 31*a* injected into the waveguide 40 by the transmit/receive unit 50.

By means of the sealing element 70*b* having convexly curved surfaces 71*b*, 72*b* according to FIG. 4 it is possible to focus the electromagnetic waves 31*a* injected into the waveguide 40 onto the rotor blade tip 141. In this way the distance Δx in relation to a narrowly limited region determined by the focus on the rotor blade tip 141 is determined during the evaluation of the electromagnetic waves 32*a* scattered back from said region. Since the rotor blade 14 continues moving in the direction of the arrow z in a succeeding time window during the operation of the gas turbine 10, the distance Δx will change in a profile-related manner in said next time window due to the profiling of the rotor blade tip 141.

With the aid of the aforementioned exemplary receive diode as a means 52 for receiving electromagnetic waves, the reflected portion 32*a* of the emitted electromagnetic waves 31*a* is detected and converted into corresponding electrical signals which are supplied to the evaluation unit 60. The profile-related time-dependent phase value $\phi_r a(t)$ of the electromagnetic waves 32*a* is first determined from the electrical signals by means of the evaluation unit 60. Next, the constant phase $\phi_0 a$ of the emitted electromagnetic waves 31a is compared with the aid of a phase comparison means 61 with the time-dependent phase $\phi_r a(t)$ of the reflected portion 32a of the emitted electromagnetic waves 31a. The time-dependent phase comparison value $\Delta\phi a(t)$, which is determined for example by means of a phase difference value $\Delta\phi a(t)=\phi_r a(t)-\phi_0 a$, is in this case directly dependent on the distance traversed by the electromagnetic waves 31a injected by the injection means 51. Said phase comparison value $\Delta\phi a(t)$ is then assigned with the aid of an assignment means 62 to a time-dependent measured value $M(t)$ for the distance $\Delta x$ between rotor blade tip 141 and wall 111. The assignment can be made for example on the basis of a value table or also a suitable algorithm.

In order to determine the rotor blade tip profile, the evaluation unit 60 additionally has an assignment means 63 with the aid of which the obtained time-dependent phase comparison value $\Delta\phi a(t)$ is assigned to a spatially resolved rotor blade tip profile $L(z)$ in the lateral direction z.

By means of the sealing element 70c having concavely curved surfaces 71c, 72c according to FIG. 5 it is possible to emit the electromagnetic waves 31a injected into the waveguide 40 in a scattered manner in the direction of the rotor blade tip 141. In this way the distance $\Delta x$ is determined during the evaluation of the electromagnetic waves 32a scattered back from the entire rotor blade tip 141. Due to the profiling of the rotor blade tip 141 different phase values $\phi_r a_i$ for the back-scattered wave portions 32a_i result in the totality of all back-scattered wave portions 32a_i (i=natural number; in FIG. 5: i=1, 2). The profile of the rotor blade tip 141 can then be deduced from said profiling-related phase difference of the back-scattered wave portions 32a_i.

With the aid of the aforementioned exemplary receive diode as a means 52 for receiving electromagnetic waves, the reflected portion 32a_i of the emitted electromagnetic waves 31a is detected and converted into corresponding electrical signals which are supplied to the evaluation unit 60. An ensemble i of phase values $\phi_r a_i$ of the electromagnetic waves 32a_i is first determined in a profile-related manner from the electrical signals by means of the evaluation unit 60. Next, the constant phase $\phi_0 a$ of the emitted electromagnetic waves 31a is compared with the aid of a phase comparison means 61 with the different phases $\phi_r a_i$ of the reflected portion 32a_i. The different phase comparison values $\Delta\phi a_i$, which are determined for example by means of phase difference values $\Delta\phi a_i = \phi_r a_i - \phi_0 a$, are in this case directly dependent on the distance traversed by the electromagnetic waves 31a injected by the injection means 51. Said phase comparison values $\Delta\phi a_i$ are then assigned with the aid of an assignment means 62 to a measured value M for the distance $\Delta x$ between rotor blade tip 141 and wall 111. The assignment can be made for example on the basis of a value table or also a suitable algorithm.

In order to determine the rotor blade tip profile, the well-known SAR method (SAR: Synthetic Aperture Radar) is applied. For this purpose the evaluation unit 60 additionally has a further assignment means 64 with the aid of which the obtained profile-dependent phase comparison values $\Delta\phi a_i$ are assigned to a spatially resolved rotor blade tip profile $L(z)$ in the lateral direction z.

The present invention is not restricted to the exemplary embodiments shown. The scope of protection also covers the provision of a plurality of waveguides 40 for emitting and/or receiving, in order, for example, to achieve measurement redundancy or also greater precision.

The invention claimed is:

1. A device for determining a distance between a rotor blade and a wall of a turbine engine surrounding the rotor blade, comprising:
   a waveguide that guides and emits electromagnetic waves in a direction to the rotor blade through a waveguide opening facing the rotor blade;
   a sealing element arranged in the waveguide that reflects a first portion of the electromagnetic waves having a first frequency and transmits through a second portion of the electromagnetic waves having a second frequency to the rotor blade;
   a first unit that injects the electromagnetic waves into the waveguide;
   a second unit that receives reflected portions of the electromagnetic waves comprising a first reflected portion of the electromagnetic waves reflected by the sealing element and a second reflected portion of the electromagnetic waves reflected by the rotor blade; and
   an evaluation unit that compares phases of the electromagnetic waves to be injected with phases of the reflected portions of the electromagnetic waves for each frequency and determines the distance based on the phase comparison.

2. The device as claimed in claim 1, wherein the sealing element comprises two mutually opposing surfaces that are flat and parallel to each other.

3. The device as claimed in claim 1, wherein the sealing element is arranged in a region of the waveguide opening.

4. The device as claimed in claim 1, wherein the sealing element has a dielectric constant in a range from 6 to 20.

5. The device as claimed in claim 1, wherein the sealing element is made from a ceramic.

6. The device as claimed in claim 5, wherein the sealing element is made from $Al_2O_3$.

7. The device as claimed in claim 1, wherein the electromagnetic waves are millimeter waves.

8. The device as claimed in claim 7, wherein the electromagnetic waves comprise a frequency range from 70 GHz to 150 GHz.

9. A method for determining a distance between a rotor blade and a wall of a gas turbine surrounding the rotor blade, comprising:
   injecting electromagnetic waves into a waveguide;
   guiding and emitting the electromagnetic waves by the waveguide in a direction to the rotor blade through a waveguide opening facing the rotor blade;
   reflecting a first portion of the electromagnetic waves having a first frequency by a sealing element of the waveguide;
   transmitting a second portion of the electromagnetic waves having a second frequency through the sealing element to the rotor blade;
   reflecting the second portion of the electromagnetic waves by the rotor blade;
   receiving reflected portions of the electromagnetic waves comprising the first reflected portion and the second reflected portion of the electromagnetic waves;
   comparing phases of the electromagnetic waves to be injected with phases of the reflected portions of the electromagnetic waves for each frequency; and
   determining the distance based on the phase comparison.

10. The method as claimed in claim 9, wherein the waveguide is arranged in a cooling channel of the wall.

* * * * *